(12) United States Patent
Svejkovsky et al.

(10) Patent No.: US 10,005,623 B1
(45) Date of Patent: Jun. 26, 2018

(54) ADJUSTABLE GATE

(71) Applicants: Karen Sue Svejkovsky, Trustee of the Paul A. Svejkovsky Family Trust, Rockwall, TX (US); Karen Sue Svejkovsky, Trustee for the P.A. & K.S. Svejkovsky Living Trust dated Jul. 9, 1997, as amended, Rockwall, TX (US); Paul Blake Svejkovsky, Coppell, TX (US)

(72) Inventors: Paul Blake Svejkovsky, Coppell, TX (US); Jason L. Danner, Lantana, TX (US)

(73) Assignee: Karen Sue Svejkovsky, Rockwall, TX (US), Trustee of the Paul A. Svejkovsky Family Trust (*) Notice: Subject to any disclaimer, the term of this patent is extended or adjusted under 35 U.S.C. 154(b) by 0 days. days.

(21) Appl. No.: 15/474,469

(22) Filed: Mar. 30, 2017

(51) Int. Cl.
| | |
|---|---|
| B65G 47/78 | (2006.01) |
| B65G 47/19 | (2006.01) |
| B65G 47/72 | (2006.01) |
| B65G 47/34 | (2006.01) |
| B65G 47/44 | (2006.01) |
| B65G 25/04 | (2006.01) |

(52) U.S. Cl.
CPC ............ B65G 47/44 (2013.01); B65G 25/04 (2013.01)

(58) Field of Classification Search
None
See application file for complete search history.

(56) References Cited

U.S. PATENT DOCUMENTS

| | | | | |
|---|---|---|---|---|
| 6,378,688 B1* | 4/2002 | Fitzgerald | ............... | B65G 27/04 198/360 |
| 7,222,714 B2* | 5/2007 | Lilly | ...................... | B65G 47/78 198/359 |
| 9,499,328 B2* | 11/2016 | Daniels | ............... | B65G 47/1492 |
| 9,523,602 B2* | 12/2016 | Otoshi | .................. | G01G 19/387 |
| 9,567,163 B2* | 2/2017 | Svejkovsky | ........... | B65G 27/16 |

* cited by examiner

Primary Examiner — Kavel Singh
(74) Attorney, Agent, or Firm — Patrick K. Steele (57) ABSTRACT

An adjustable conveyor gate for receiving goods from a conveyor and for selectively being adjusted to direct the received goods to one of at least two receiving structures, the adjustable conveyor gate having a rotatable trough extender with an opening therein with a proximal drop wall and a distal drop wall angularly and axially spaced from the proximal drop wall. Positioning the proximal drop wall at an elevated position, with the distal drop wall at a lowered position, causes goods moving through the adjustable conveyor gate to drop from the distal drop wall to a first receiving structure there beneath. Positioning the distal drop wall at an elevated position, with the proximal drop wall at a lowered position, causes goods moving through the adjustable conveyor gate to drop from the proximal drop wall to a second receiving structure there beneath.

17 Claims, 10 Drawing Sheets

ADJUSTABLE GATE

BACKGROUND

Field of the Invention

The present invention relates to an adjustable conveyor gate for use in a conveyor system. The adjustable conveyor gate can be adjusted to pass all, none or a selected fraction of a stream of goods or product received into the adjustable gate from a conveyor. A stream of goods or product may be dropped from a terminus of a conveyor having the adjustable conveyor gate to a first receiving structure or to a second, adjacent receiving structure using the adjustable conveyor gate. The adjustable conveyor gate can also be positioned to divide the incoming stream of goods or product between two adjacent receiving structures.

Background of the Related Art

Various types of conveyor gates have been devised for controllably moving and directing a stream of goods or product. Some conveyor gates are used for removing a stream of goods from a conveyor. These conveyor gates may include powered drive devices that may be activated to position the conveyor gate based on an operator's input. These conveyor gates may be in an open position, so that the goods drop from a conveyor system that includes the conveyor gate to a lower receiving structure which may be, for example, another conveyor system or a storage member.

Gates for conventional conveyor systems commonly include a slide mechanism that opens and closes an opening in the gate. These conventional gates can damage fragile goods or product when the gate is moved from the open to the closed position. Additionally, powered slide mechanisms used to operate conventional gates may present a safety hazard to operations personnel because a closing gate may capture a finger or an article of clothing worn by an equipment operator working near the gate.

Various devices for sorting and redirecting goods moved on a reciprocating conveyor include a rotatable sleeve portion and a stationary conveyor portion that are coupled one to the other using complicated structures that are expensive to manufacture and/or are difficult to disassemble, clean and reassemble.

These and other disadvantages of the prior art are overcome by the present invention.

SUMMARY OF THE INVENTION

One embodiment of the present invention provides an adjustable gate that is securable to a terminus of a conveyor so that the conveyor is disposed on an upstream or proximal side of the adjustable conveyor gate. The conveyor discharges a stream of goods or product to the adjustable gate. The adjustable conveyor gate includes a rotatable trough extender that is a generally tubular member having an opening, which may be a bounded opening or an unbounded opening. If the rotatable trough extender of the adjustable gate is in a first position to dispose the opening downwardly, a first receiving structure disposed adjacent to and beneath a proximal portion of the rotatable trough extender will receive the goods or product. If the rotatable trough extender of the adjustable gate is in a second position with the opening disposed upwardly as a result of having been rotated through an angle of, for example, but not by way of limitation, 180 degrees (3.142 radians), a second receiving structure disposed adjacent to and beneath a distal portion of the rotatable trough extender will receive the stream of goods or product. If the rotatable trough extender of the adjustable gate is in a third position that is intermediate the first position and the second position, the incoming stream of goods or product may be divided and a first portion of the stream that will be dropped into the first receiving structure beneath a proximal portion of the trough extender and the remaining portion of the stream will be dropped into the second receiving structure beneath a distal portion of the trough extender.

The rotatable trough extender of the adjustable conveyor gate is rotatable relative to the terminus of the conveyor to which the adjustable conveyor gate is secured to enable the selective positioning of the opening in the rotatable trough extender at an elevated position to remove it from the path of the stream of goods or product moving through the adjustable conveyor gate. This causes the stream of goods or product to move along the trough extender to a distal drop edge where the stream of goods or product is dropped to a receiving structure there beneath. Alternately, the rotatable trough extender may be rotated by 180 degrees (3.142 radians) to dispose the opening at a lowered position that is in the path of the stream of goods or product so that all of the stream of goods or product that enter the trough extender of the adjustable gate from the conveyor will drop from a proximal drop edge adjacent to the opening in the rotatable trough extender of the adjustable gate to another receiving structure there beneath. For example, but not by way of limitation, a receiving conveyor positioned underneath a proximal portion of the trough extender of the adjustable gate may receive the stream of goods or product or a receiving conveyor positioned underneath a distal portion of the trough extender of the adjustable conveyor gate may receive the stream of goods or product. In a preferred embodiment, the rotatable trough extender of the adjustable conveyor gate of the present invention is rotatable by activation of an electrically powered motor that operates a drive gear that engages a gear on the trough extender.

The adjustable conveyor gate of the present invention includes a rotating assembly that has the rotatable trough extender, a gear having a bore that is connected to the rotatable trough extender, and one of a bearing race outer portion and a bearing race inner portion formed onto the gear, and the adjustable conveyor gate further includes a stationary assembly that has a mounting portion for being secured to a terminus of a conveyor, the other of the bearing race outer portion and the bearing race inner portion disposed in an engaged position with the one of the bearing race outer portion and the bearing race inner portion of the rotating assembly to together form a bearing race, and a plurality of rolling elements sized for being introduced through a port in one of the bearing race inner portion and the bearing race outer portion and into the bearing race. The port may be a radially directed aperture in one of the bearing race outer portion and the bearing race inner portion that is sized to pass each of the plurality of rolling elements.

The bearing race inner portion is of an outer diameter that, when introduced into a bore of the bearing race outer portion or, alternately, when the bearing race outer portion is disposed to surround the bearing race inner portion, to form a bearing race, the introduction of the rolling elements (that are sized for rolling movement within the bearing race) axially secures the rotatable trough extender and the gear and the one of the bearing race outer portion and bearing race inner portion to the mounting portion, the terminus of the conveyor and the other of the bearing race outer portion and bearing race inner portion, while not impairing the rotatability of the rotatable trough extender of the adjustable gate relative to the terminus of the conveyor.

The mounting portion of the stationary assembly of the adjustable conveyor gate is secured to a terminus of a conveyor. It will be understood that the terms "discharge end" and "terminus," as used herein, are interchangeable terms that indicate the direction of movement of the stream of goods or product moved on the conveyor to the adjustable conveyor gate. The conveyor may be a reciprocating conveyor that moves goods or product in a distal direction along the conveyor by moving, at a first rate of acceleration, in the distal direction to move the goods or product supported thereon in the distal direction, then by moving, at a second rate of acceleration greater than the first rate of acceleration, in the opposite, proximal direction to cause the goods or product supported on the conveyor to slip on the conveyor due to a lack of sufficient friction. The conveyor that operates in this manner is referred to as a differential impulse driver. It will be understood that this repeated cycle of reciprocating movement will result in the goods or product supported on the conveyor to be moved in the distal direction on the conveyor and ultimately to deliver the goods or product to the adjustable conveyor gate at the terminus of the conveyor.

These and further features and advantages of the present invention will become apparent from the following detailed description, wherein reference is made to the appended drawings.

DETAILED DESCRIPTION OF PREFERRED EMBODIMENTS

Figure 1:
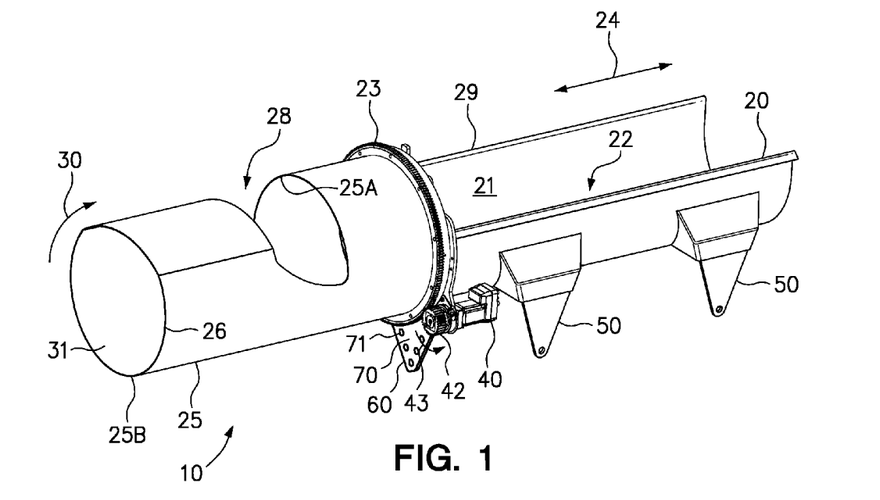
FIG. 1 is a perspective view of an embodiment of an adjustable conveyor gate of the present invention (with protective shroud(s) removed to reveal components) coupled to a terminus of a reciprocating conveyor adapted for being driven by a differential impulse driver (not shown).

FIG. 1 is a perspective view of an embodiment of an adjustable conveyor gate 10 of the present invention (with shroud removed to reveal components) coupled to a terminus 29 of a reciprocating conveyor 20 adapted for being driven by a differential impulse driver (not shown in FIG. 1). The conveyor 20 reciprocates in the directions indicated by the double-headed arrow 24 in an asymmetric manner (for acceleration) to move goods or product (not shown) placed on the conveyor 20 towards the adjustable conveyor gate 10 coupled to the terminus 29. The conveyor 10 may include supports 50 connected to the conveyor 10 to engage pivoting leg supports (not shown) of the kind used with some embodiments of reciprocating conveyors. The conveyor 10 includes sidewalls 21 to contain the goods or product disposed on the conveyor 10. The conveyor 20 further includes a trough 22 intermediate the sidewalls 21 to slidably support the goods or product moved thereon.

The adjustable conveyor gate 10 of FIG. 1 includes a gear 23 having a bearing race portion thereon (not shown in FIG. 1—see FIG. 4) and a trough extender 25 having an opening 28 disposed therein that is connected to the gear 23 to form a rotating assembly. In one embodiment of the apparatus of the present invention, the opening 28 in the trough extender 25 spans less than 180 degrees of the circumference of the trough extender 28. The bounded opening 28 of the rotatable trough extender 25 includes a proximal drop edge 25A and a distal end 26 of the rotatable trough extender 25 includes a distal drop edge 25B. The rotatable trough extender 25 can be rotated as indicated by the arrow 30 by activation of a motor 40 to rotate a drive gear 42 that is engaged with the gear 23 connected to the rotatable trough extender 25. In the position illustrated in FIG. 1, the opening 28 and the proximal drop edge 25A are elevated and the distal drop edge 25B is lowered so that goods or product discharged from the conveyor 20 to the adjustable conveyor gate 10 will be conveyed to the distal drop edge 25B where the goods or product will fall from the adjustable conveyor gate 10 to a receiving structure (not shown) disposed there beneath. In a position obtainable by operation of the motor 40 to rotate the trough extender 25 180 degrees in the direction indicated by the arrow 30 from the position illustrated in FIG. 1, the opening 28 and the proximal drop edge 25A would be lowered and the distal drop edge 25B will be elevated so that goods or product discharged from the conveyor 20 to the adjustable conveyor gate 10 will be conveyed to the proximal drop edge 25A where the goods or product will fall from the adjustable conveyor gate 10 to a receiving structure (not shown) disposed there beneath. It will be understood that the adjustable conveyor gate 10 can, through operation of the motor 40, be used to direct the conveyed goods or product discharged from the conveyor 20 to a first receiving structure (not shown) beneath the proximal drop edge 25A, to a second receiving structure (not shown) beneath the distal drop edge 25B. In another mode, the opening 28 can be positioned intermediate the fully elevated and the fully lowered position to cause an incoming stream of goods or product to be divided and for some of the stream to drop from the proximal drop edge 25A and the remainder of the stream to drop from the distal drop edge 25B. In this mode, the stream will be divided between a first receiving structure (not shown) beneath the proximal drop edge 25A and also to a second receiving structure (not shown) beneath the distal drop edge 25B.

The adjustable conveyor gate 10 may include a mounting portion 70 (not fully shown in FIG. 1—see FIGS. 5, 6, 8 and 9). The mounting portion 70 may include apertures 71 for fasteners (not shown) for securing the adjustable conveyor gate 10 to a terminus 29 of a conveyor 20.

Figure 2:
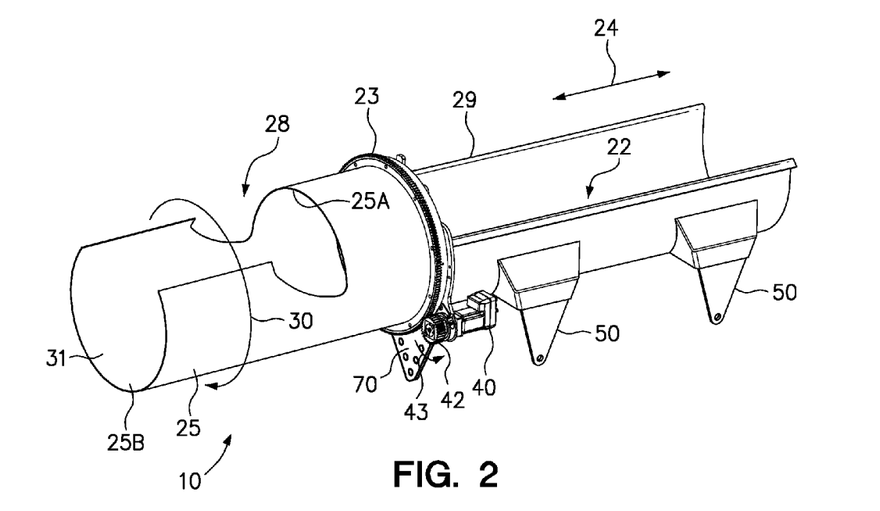
FIG. 2 is a perspective view of an alternative embodiment of an adjustable conveyor gate of the present invention (with shroud removed to reveal components) having a modified trough extender coupled to a terminus of a reciprocating conveyor adapted for being driven by a differential impulse driver.

FIG. 2 is a perspective view of an alternative embodiment of an adjustable conveyor gate 10 of the present invention (with shroud removed to reveal components) having a mounting portion 70 coupled to a terminus 29 of a reciprocating conveyor 20 adapted for being driven by a differential impulse driver (not shown). The alternative trough extender 25 of the embodiment of the adjustable conveyor gate 10 of FIG. 2 includes an unbounded opening 28 including a proximal drop edge 25A and it further includes a distal drop edge 25B. The other components, including the gear 23, motor 40, drive gear 42, mounting portion 70 are the same as in the embodiment of FIG. 1. The trough extender 25 of the embodiment of the adjustable conveyor gate 10 of FIG. 2 provides for easier cleaning and requires less material than the trough extender 25 of the embodiment of the adjustable conveyor gate 10 of FIG. 1.

Figure 3:
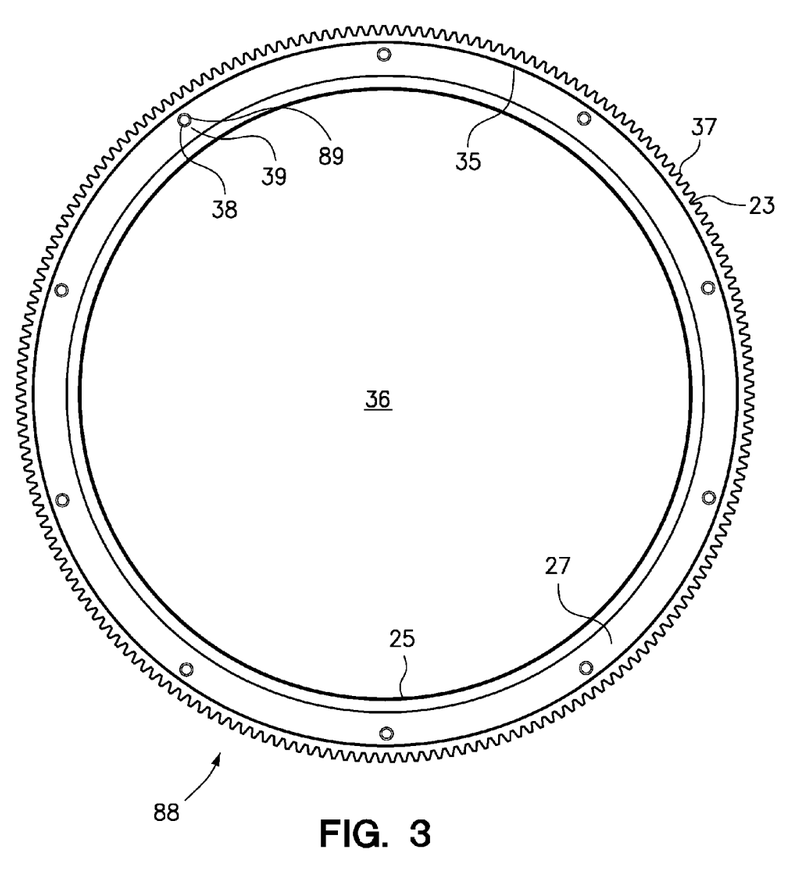
FIG. 3 is an elevation view of a rotating assembly of an embodiment of the adjustable conveyor gate of the present invention including a gear, a bearing race inner portion and a trough extender.

FIG. 3 is an elevation view of a rotating assembly 88 of the adjustable conveyor gate 10 including a gear 23, a bearing race portion 35 extending from the gear 23 towards the viewer, and a trough extender 25 extending from the viewer into the page. The rotating assembly 88, gear 23 and trough extender 25 include a bore 36 through which goods or product discharged from the conveyor 20 pass. The rotating assembly 88 may include a plurality of ears 39, each having an aperture 38, for connecting the trough extender 25 to the gear 23 using fasteners 89. A radially outwardly extending flange 27 may be provided on the trough extender 25 for being connected to the ears 39 using the fasteners 89 such as, for example, screws or rivets. The gear 23 includes circumferential teeth 37 for engaging a drive gear 42 (see FIGS. 1 and 2).

Figure 4:
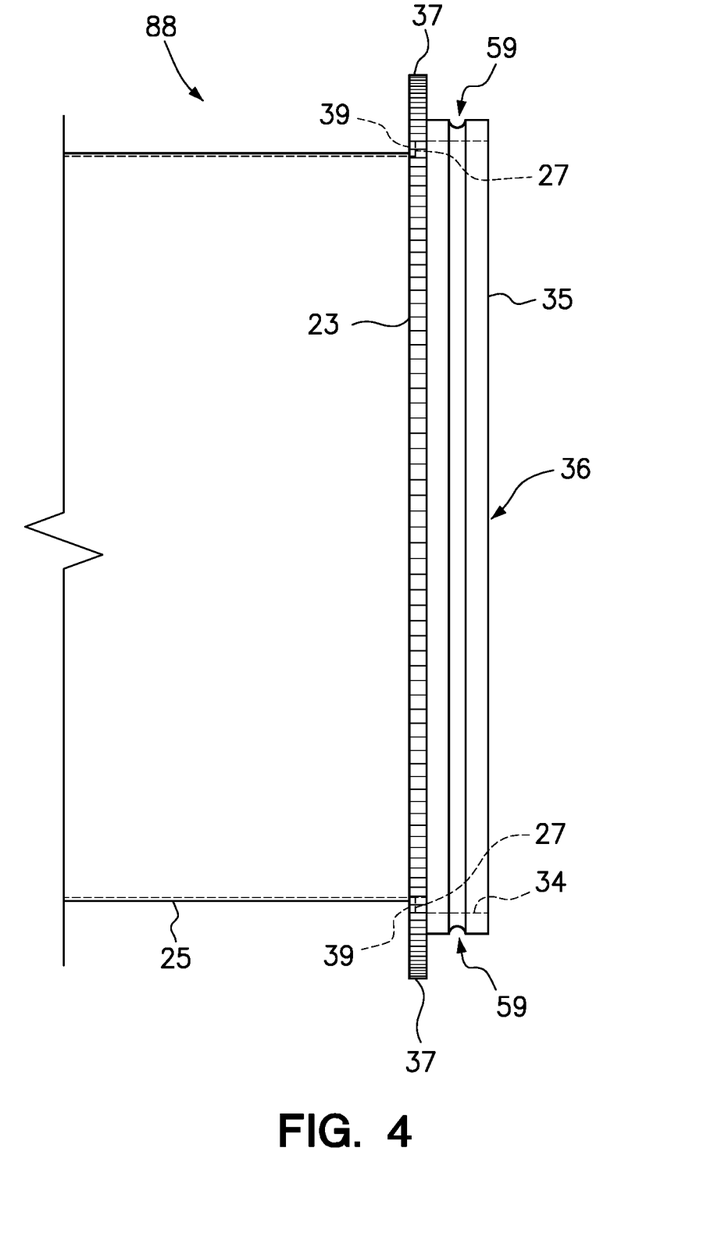
FIG. 4 is a sectional elevation view of the rotating assembly of the embodiment of the adjustable conveyor gate of FIG. 1.

FIG. 4 is a sectional elevation view of the rotating assembly 88 of the adjustable conveyor gate of FIG. 1. The proximally extending gear 23 is illustrated as being disposed intermediate a bearing race inner portion 59 having a bore 36 with an interior wall 34. The rotating assembly 88 includes a distally extending trough extender 25 disposed on the gear 23. The circumferential teeth 37 of the gear 23 are provided for engaging the drive gear 42 (not shown—see FIGS. 1 and 2). The trough extender 25 of FIG. 4 includes a radially outwardly extending flange 27 for connecting to the ears 39 on the gear 23.

Figure 5:
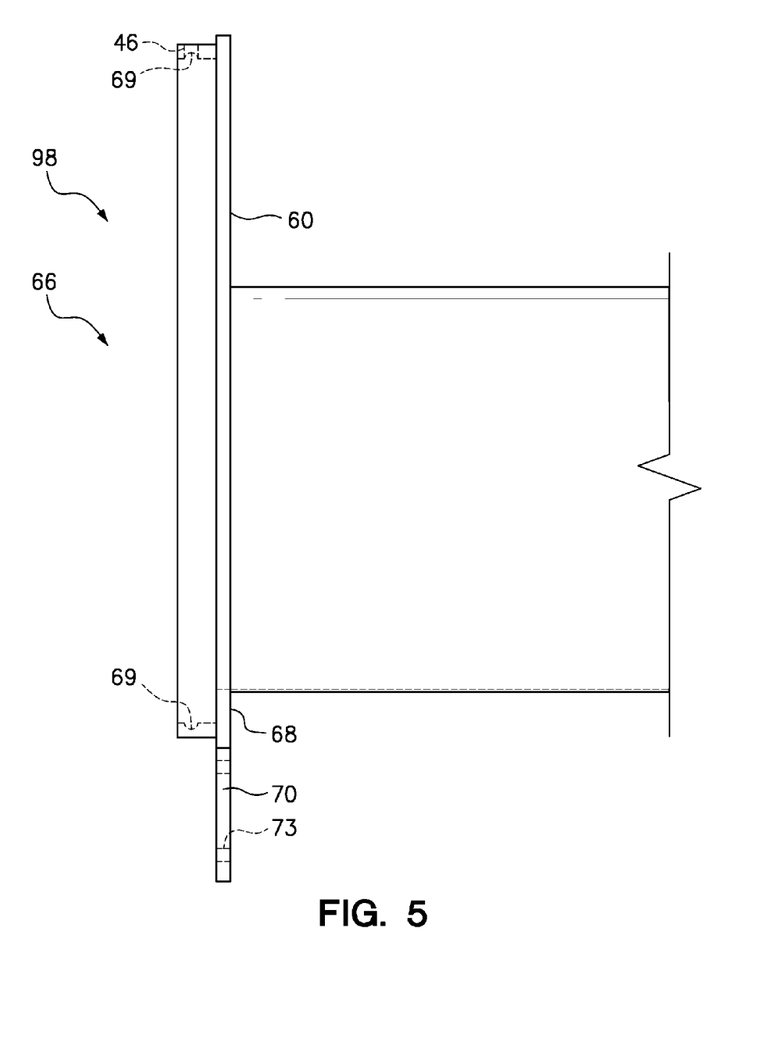
FIG. 5 is a sectional elevation view of a stationary assembly of an embodiment of the adjustable conveyor gate of the present invention, the stationary assembly including a bearing race outer portion and a mounting portion.

FIG. 5 is a sectional elevation view of a stationary assembly 98 of an embodiment of the adjustable conveyor gate 10 of the present invention, the stationary assembly 98 including an bearing race outer portion 69 and a mounting portion 70. The goods or product (not shown) passes through the bore 66 of the stationary assembly 98. The stationary assembly 98 of FIG. 5 may further include a port 46 through which rolling elements 99 (not shown in FIG. 5) may be introduced after the bearing race inner portion 59 is positioned radially within and mated with the bearing race outer portion 69 to provide a fully circumferential and continuous bearing race into which the rolling elements 99 can be introduced. It will be understood that the introduction of rolling elements 99 into the bearing race causes the rotating assembly 88 to be axially secured to the stationary assembly 98 without impairment of the capacity of the rotating assembly 88 to rotate relative to the stationary assembly 98.

Figure 6:
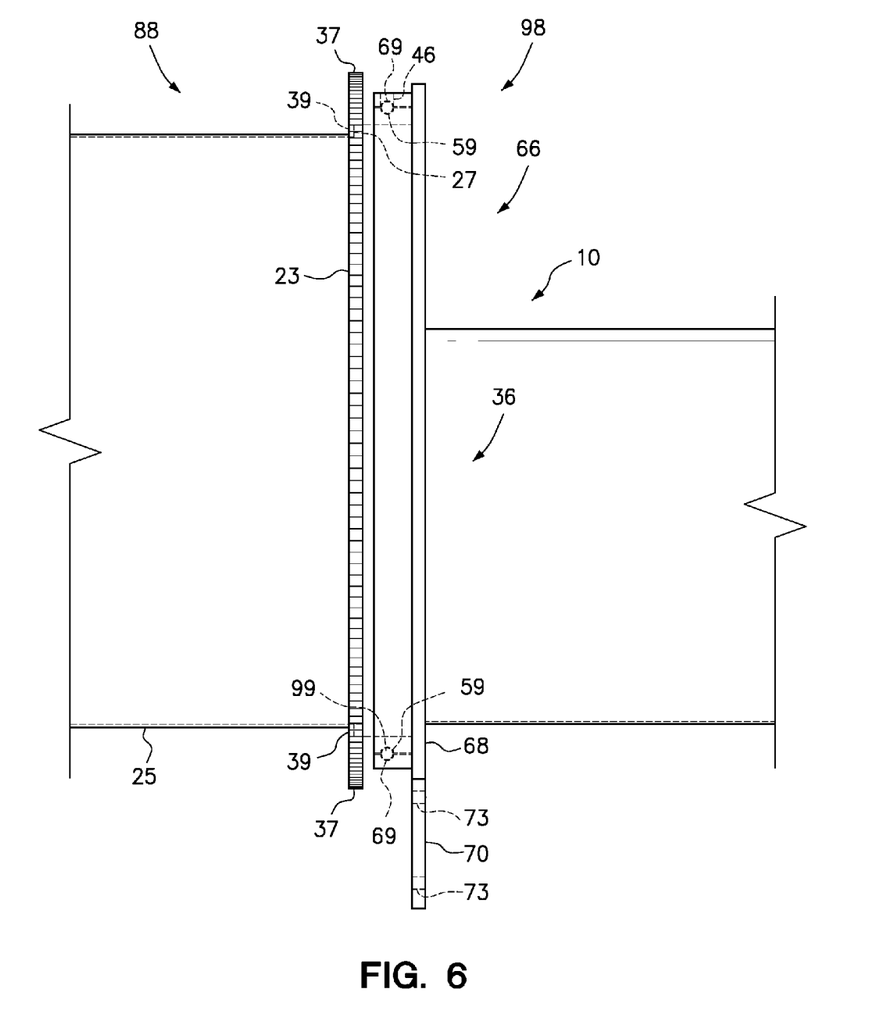
FIG. 6 is a sectional view of an embodiment of the adjustable conveyor gate of the present invention including the rotating assembly of FIG. 4 axially coupled to the stationary assembly of FIG. 5, and further including a plurality of rolling elements introduced into a bearing race formed of the bearing race inner portion of the rotating assembly of FIG. 4 rotatably disposed radially within the bearing race outer portion of the stationary assembly of FIG. 5.

FIG. 6 is a sectional view of an embodiment of the adjustable conveyor gate 10 of the present invention including the rotating assembly 88 of FIG. 4 rotatably coupled to and axially secured to the stationary assembly 98 of FIG. 5, and further including a plurality of rolling elements 99 introduced into a bearing race formed of the bearing race outer portion 69 of the stationary assembly 98 of FIG. 5 and the bearing race inner portion 59 of the rotating assembly 88 of FIG. 4 disposed radially within the bearing race outer portion 69 of the stationary assembly 98 of FIG. 5. The bore 36 of the rotating assembly 88 and the bore 66 of the stationary assembly 98 coincide to provide a passage for the goods or product discharged from the conveyor 20 (not shown in FIG. 6).

Figure 7:
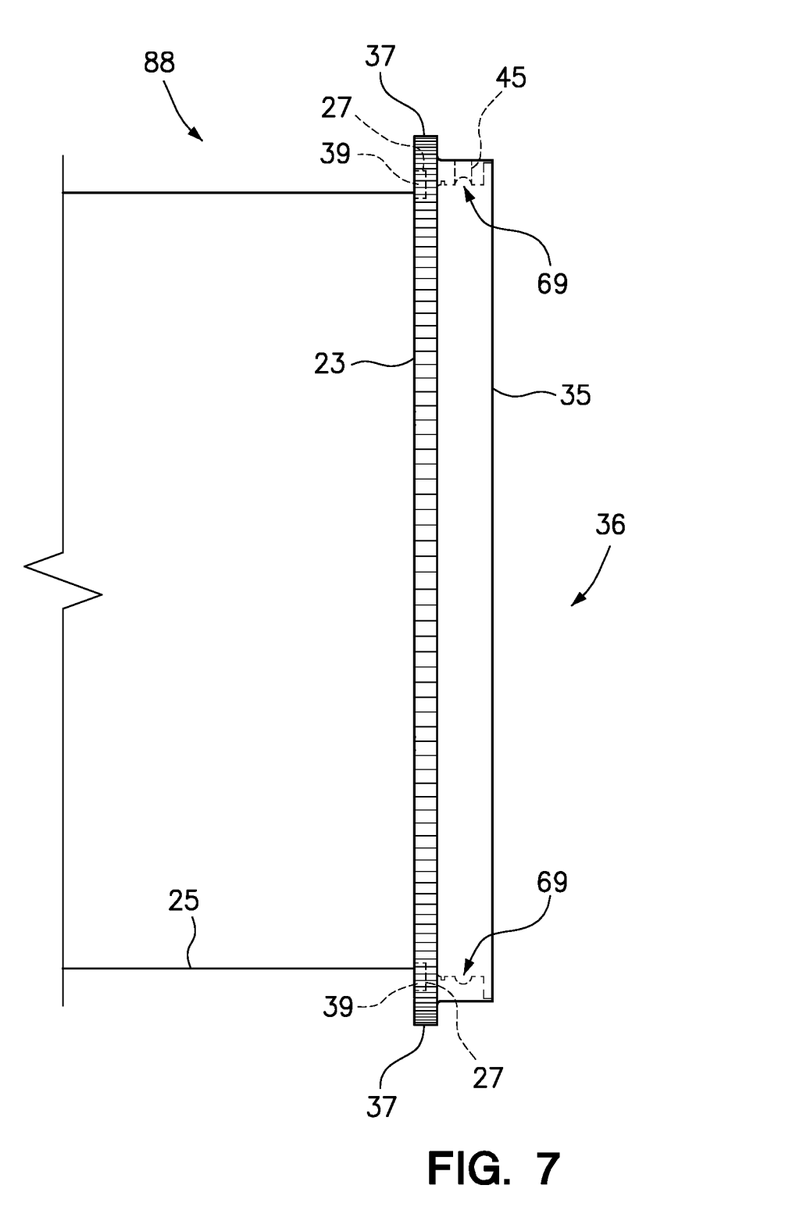
FIG. 7 is a sectional elevation view of a rotating assembly of an alternative embodiment of the adjustable conveyor gate of the present invention having a bearing race outer portion adapted to circumferentially surround a bearing race inner portion of a stationary assembly.

FIG. 7 is a sectional elevation view of a rotating assembly 88 of an alternative embodiment of the adjustable conveyor gate 10 of the present invention having a gear 23 with a bearing race outer portion 69 adapted to circumferentially surround a bearing race inner portion 59 of a stationary assembly 98 (not shown). Like the trough extender 25 of FIG. 4, the trough extender 25 of FIG. 7 includes a radially outwardly extending flange 27 that is connected to ears 39 within the gear 23 using fasteners (not shown). The gear 23 includes teeth 37 for engaging the drive gear 42 (see FIGS. 1 and 2). The rotating assembly 88 includes a bore 36 through which goods or product discharged from the conveyor 20 may pass.

Figure 8:
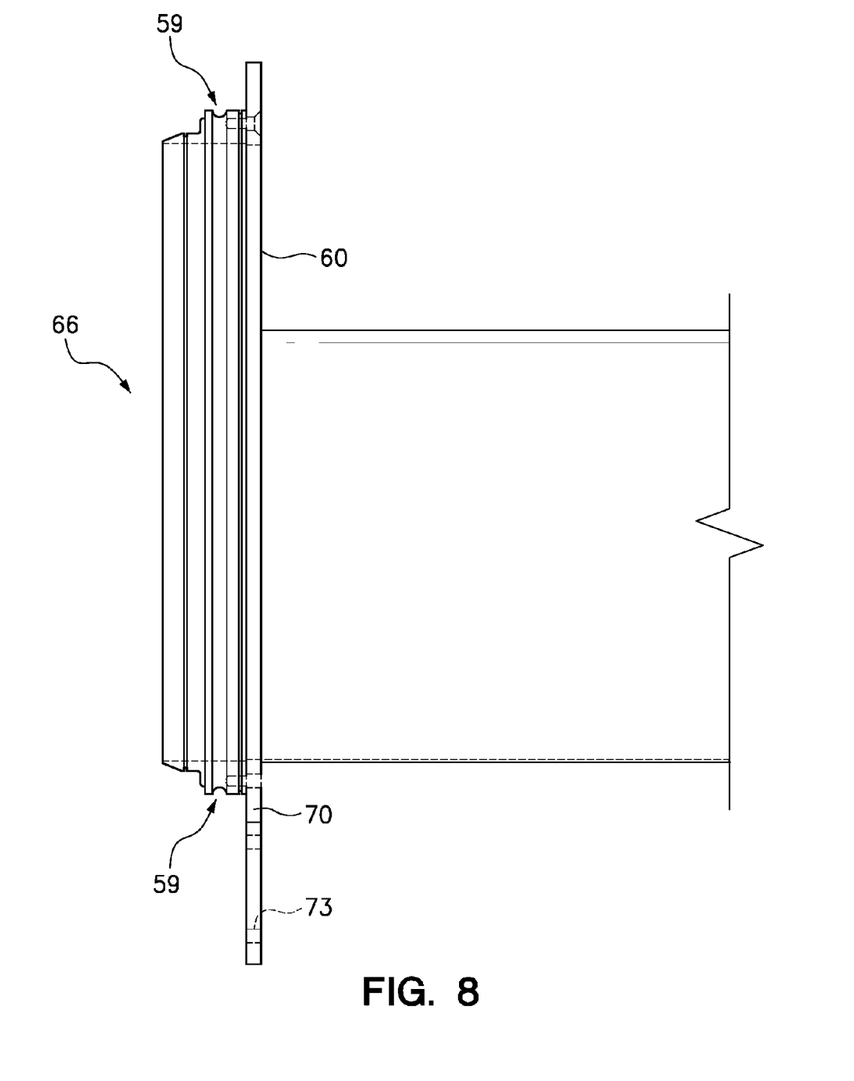
FIG. 8 is a sectional elevation view of a stationary assembly of an alternative embodiment of the adjustable conveyor gate of the present invention, the stationary assembly including a mounting portion and a bearing race inner portion adapted for being disposed within the bearing race outer portion of the rotating assembly of FIG. 8 to form a bearing race.

FIG. 8 is a sectional elevation view of a stationary assembly 98 of an alternative embodiment of the adjustable conveyor gate 10 of the present invention, the stationary assembly 98 including a bearing race inner portion 59 adapted for being disposed radially within the bearing race outer portion 69 of the rotating assembly 88 of FIG. 7 to form a fully circumferential and continuous bearing race. The stationary assembly 98 includes a mounting portion 70 with apertures 73 to receive fasteners (not shown) for securing the stationary assembly 98 to a terminus of a conveyor 20 (not shown in FIG. 8—see FIG. 1).

Figure 9:
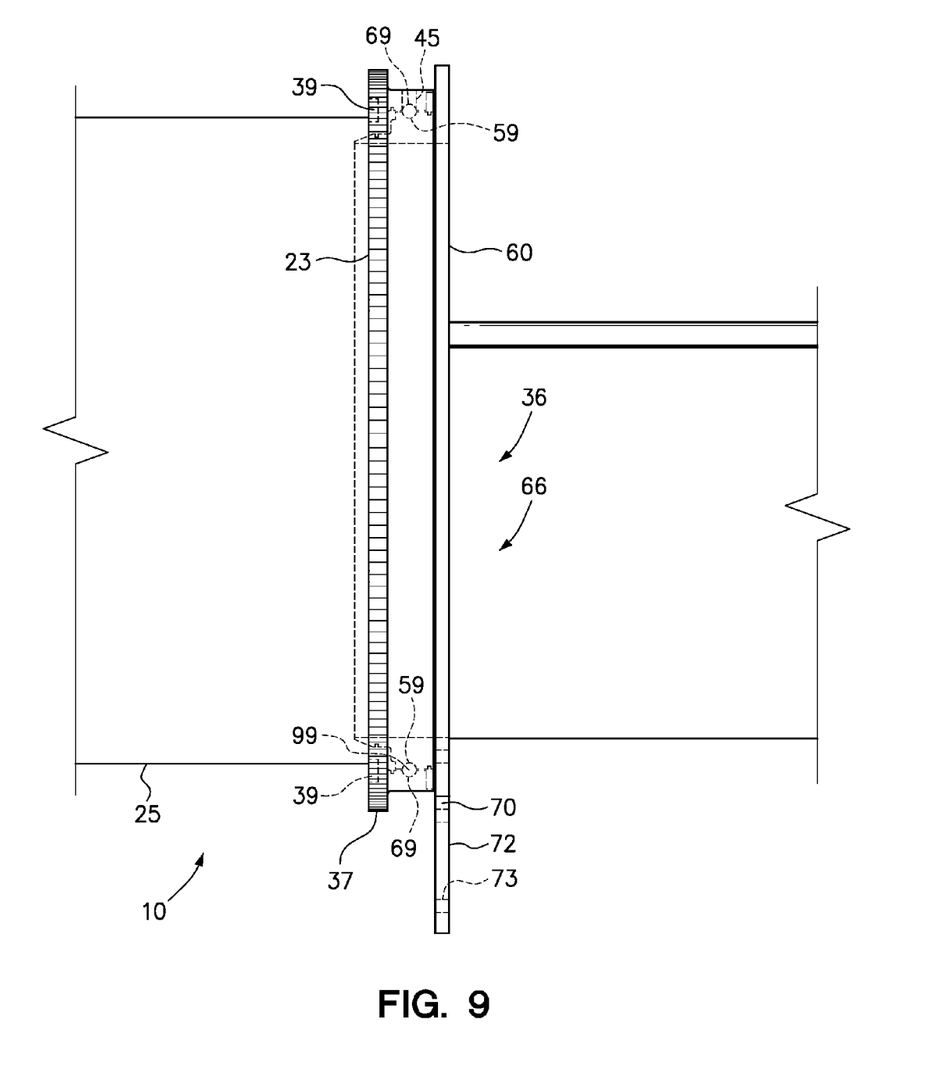
FIG. 9 is a sectional view of an alternative embodiment of the adjustable conveyor gate of the present invention including the rotating assembly of FIG. 7 coupled to the stationary assembly of FIG. 8, and further including a plurality of rolling elements introduced into a bearing race formed of the bearing race outer portion of the rotating assembly of FIG. 7 rotatably disposed within the bearing race portion of the stationary assembly of FIG. 8.

FIG. 9 is a sectional view of an alternative embodiment of the adjustable conveyor gate 10 of the present invention including the rotating assembly 88 of FIG. 7 rotatably coupled to the stationary assembly 98 of FIG. 8, and further including a plurality of rolling elements 99 introduced into a bearing race formed of the bearing race outer portion 69 of the rotating assembly 88 of FIG. 7 disposed radially within the bearing race inner portion 59 of the stationary assembly 98 of FIG. 8. The bore 66 of the bearing race inner portion 59 and the bore 36 of the bearing race outer portion 69 provides a passage through which goods or product discharged from a conveyor 20 (not shown) pass to move on the trough extender 25.

Figure 10:
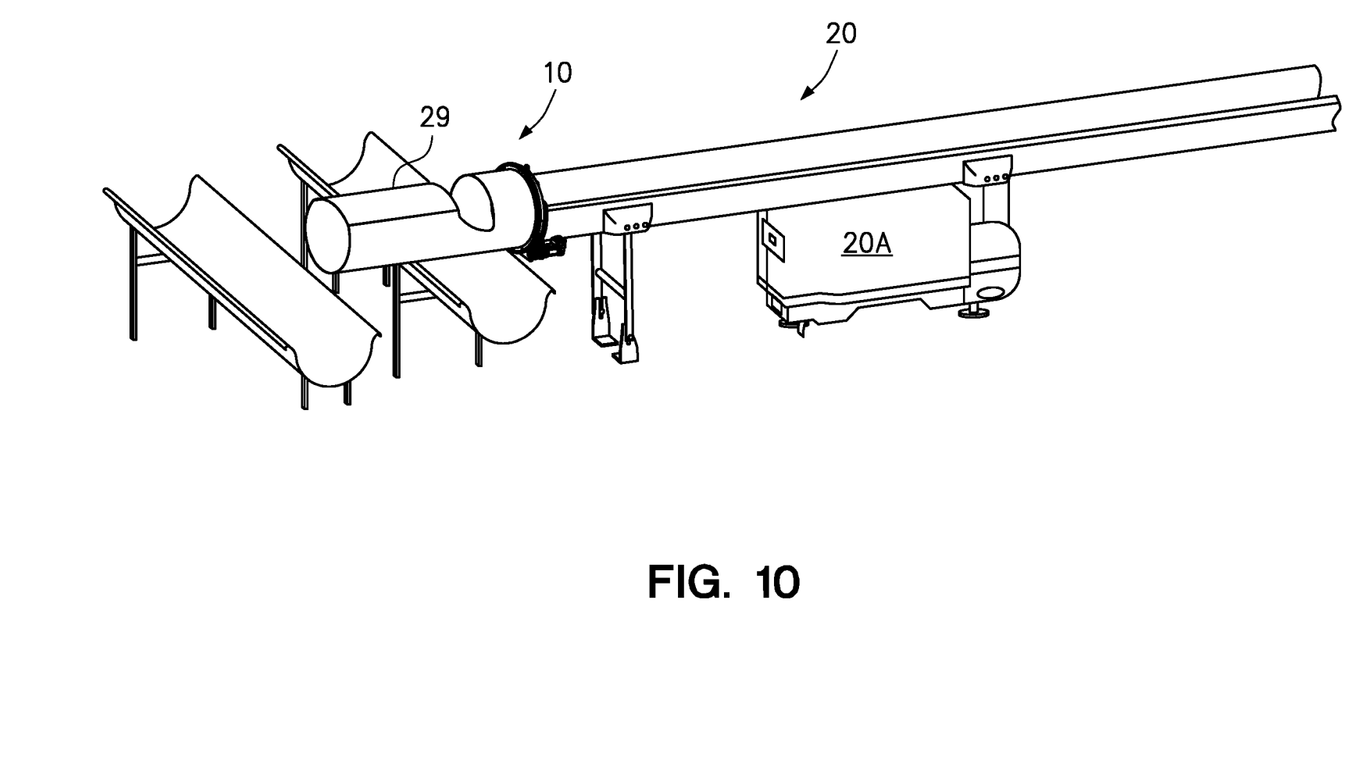
FIG. 10 is a perspective view of a reciprocating conveyor having a terminus to which an embodiment of the adjustable conveyor gate is coupled to enable control of distribution of goods or products discharged from the conveyor.

FIG. 10 is a perspective view of a reciprocating conveyor 20 having a terminus 29 to which an embodiment of the rotatable conveyor gate 10 is coupled to enable control of distribution of goods or products discharged from the terminus 29 of the reciprocating conveyor 20. FIG. 10 also shows a differential impulse driver 20A that reciprocates the conveyor 20 in an asymmetric manner that moves the goods or product along the conveyor 20.

It will be understood that the adjustable conveyor gate 10 of the present invention can be disassembled by disconnecting the stationary assembly 98 from the terminus 29 of the conveyor 20, inverting the adjustable conveyor gate 10 to downwardly dispose the port 45, and by removing the rolling elements 99 from the bearing race through the port 45. Once all rolling elements 99 are removed, the rotating assembly 88 can be axially disengaged from the stationary assembly 98. Alternately, a second port could be provided on the adjustable conveyor gate 10 to prevent the need for inverting the adjustable conveyor gate 10 to remove the rolling elements 99 to disengage the rotating assembly 88 from the stationary assembly 98.

It will be understood that the gear 23 and the drive gear 42 described above and illustrated in the appended drawings are circular torque transmission members, and that pulleys could be substituted in the place of gears as both are circular torque transmission members. For example, it will be further understood that the gear 23 and drive gear 42 of an adjustable conveyor gate 10 of the present invention may be replaced by a pulley and a drive pulley, connected one to the other by a belt, with generally equal function except that the direction of rotation (see arrow 30 in FIG. 1) of the rotating assembly 88 would be reversed with the same direction of rotation of the drive gear 42. It will be further understood that each of the rotating assembly 88 and the stationary assembly 98 can each be integrally formed or, alternately, these may be formed by connecting components one to the others using fasteners. It will be understood that one or more sealing elements may be provided on the one or both of the stationary assembly 88 and the rotating assembly 98 to prevent contamination from dirt, dust and crumbs that may be shed by the goods or product discharged from the conveyor 20.

Figure 11:
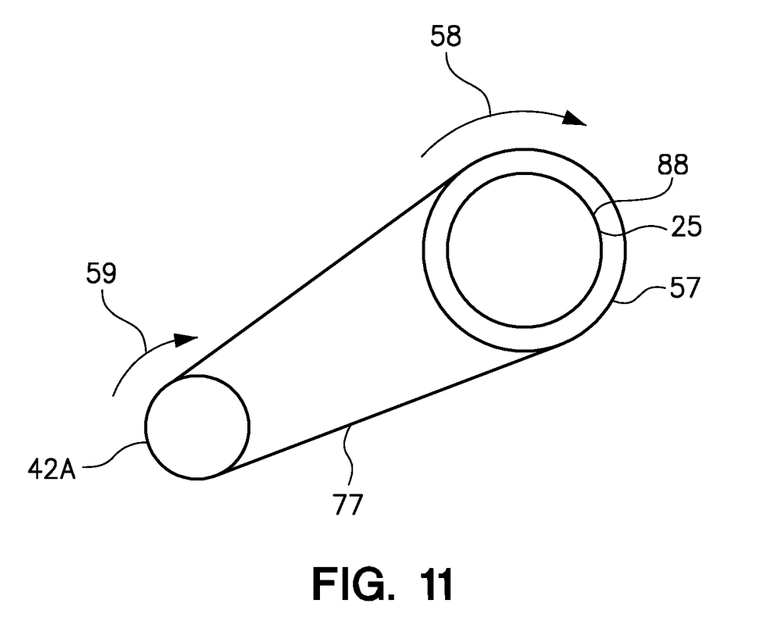
FIG. 11 is a schematic that illustrates how a belt could be used to transfer torque from a first torque transmission member connected to a drive motor (not shown) and rotating in a direction indicated by arrow 59 to a second torque transmission member connected to the rotating assembly and/or the trough extender and rotating in a direction indicated by the arrow.

FIG. 11 is a schematic that illustrates how a belt 77 could be used to transfer torque from a first torque transmission member 42A connected to a drive motor (not shown) and rotating in a direction indicated by arrow 59 to a second torque transmission member 57 connected to the rotating assembly 88 and/or the trough extender 25 and rotating in a direction indicated by the arrow 58.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An adjustable conveyor gate connectable to a conveyor, the adjustable conveyor gate comprising:
    a rotating assembly with a gear having a plurality of circumferentially disposed teeth, a bore and a tubular trough extender having a bore, a proximal drop edge and a distal drop edge;
    a stationary assembly with a mounting portion for connecting to a terminus of a conveyor;
    a circular bearing race inner portion having a bore and coupled to one of the mounting portion and the gear;
    a circular bearing race outer portion having a bore and coupled to the other of the mounting portion and the gear, the bore of the circular bearing race outer portion being sized to rotatably receive within it the bearing race inner portion to thereby form a continuous circular bearing race;
    a plurality of rolling elements; and
    a port disposed within at least one of the bearing race inner portion and the bearing race outer portion for passing a plurality of rolling elements therethrough;
    wherein the introduction of the rolling elements into the bearing race through the port rotatably couples and axially secures the bearing race inner portion and the bearing race outer portion one to the other; and
    wherein removal of the rolling elements from the bearing race through the port decouples and releases the rotating assembly from the stationary assembly to allow the adjustable conveyor gate to be disassembled and cleaned.

2. The adjustable conveyor gate of claim 1, further comprising:

a plurality of fasteners for securing the mounting portion to the conveyor.

3. The adjustable conveyor gate of claim 1, further comprising:
   a motor secured to the stationary assembly; and
   a drive gear secured to the gear of the rotating assembly;
   wherein activation of the motor rotates the drive gear to rotate the trough extender of the rotating assembly to a selected position.

4. The adjustable gate of claim 1, wherein the proximal drop edge of the trough extender is a portion of a bounded opening in the trough extender.

5. The adjustable gate of claim 1, wherein the proximal drop edge of the trough extender is a portion of an unbounded opening in the trough extender.

6. The adjustable gate of claim 1, wherein the proximal drop edge and the distal drop edge are axially spaced one from the other.

7. The adjustable gate of claim 1, wherein the proximal drop edge and the distal drop edge are angularly spaced one from the other.

8. The adjustable gate of claim 7, wherein the angular spacing is 180 degrees (3.14159 radians).

9. The adjustable gate of claim 1, wherein the port disposed within at least one of the bearing race inner portion and the bearing race outer portion comprises:
   a port disposed within the bearing race inner portion; and
   a port disposed within the bearing race outer portion.

10. The adjustable conveyor gate of claim 1, wherein the circular bearing race inner portion having a bore and coupled to one of the mounting portion and the gear is a circular bearing race inner portion having a bore and coupled to the gear; and
   a circular bearing race outer portion having a bore and coupled to the other of the mounting portion and the gear is a circular bearing race outer portion having a bore and coupled to the mounting portion.

11. The adjustable conveyor gate of claim 1, wherein the circular bearing race inner portion having a bore and coupled to one of the mounting portion and the gear is a circular bearing race inner portion having a bore and coupled to the mounting portion; and
   a circular bearing race outer portion having a bore and coupled to the other of the mounting portion and the gear is a circular bearing race outer portion having a bore and coupled to the gear.

12. The adjustable conveyor gate of claim 1, wherein the conveyor is a reciprocating conveyor driven to reciprocate by a differential impulse driver.

13. An adjustable conveyor gate connectable to a conveyor, the adjustable conveyor gate comprising:
   a rotating assembly with a first torque transmission member, a bore and a tubular trough extender having a bore, a proximal drop edge and a distal drop edge;
   a stationary assembly with a mounting portion for connecting to a terminus of a conveyor;
   a circular bearing race inner portion having a bore and coupled to one of the mounting portion and the gear;
   a circular bearing race outer portion having a bore and coupled to the other of the mounting portion and the gear;
   a plurality of rolling elements; and
   a port disposed within at least one of the bearing race inner portion and the bearing race outer portion for passing a plurality of rolling elements therethrough;
   wherein the bore of the bearing race outer portion is sized to receive the bearing race inner portion there within to form a continuous circular bearing race;
   wherein the introduction of the rolling elements into the continuous circular bearing race through the port rotatably couples and axially secures the rotating assembly and the stationary assembly one to the other; and
   wherein the removal of the rolling elements from the continuous circular bearing race through the port enables the rotating assembly to be decoupled and released from the stationary assembly to allow the adjustable conveyor gate to be disassembled and cleaned.

14. The adjustable conveyor gate of claim 13, wherein the torque transmission member of the rotating assembly engages a second torque transmission member that rotates to drive the first torque transmission member to rotate.

15. The adjustable conveyor gate of claim 14, further comprising a belt through which torque is transferred from the second torque transmission member to the first torque transmission member.

16. The adjustable conveyor gate of claim 13, wherein the proximal drop wall is a portion of a bounded opening in the trough extender.

17. The adjustable conveyor gate of claim 13, wherein the proximal drop wall is a portion of an unbounded opening in the trough extender.

* * * * *